G. KLEEMANN.
MACHINE FOR MAKING BRUSHES.
APPLICATION FILED AUG. 5, 1910.

1,038,763.

Patented Sept. 17, 1912.
5 SHEETS—SHEET 3.

WITNESSES

INVENTOR
GEORG KLEEMANN

BY
ATTORNEY

G. KLEEMANN.
MACHINE FOR MAKING BRUSHES.
APPLICATION FILED AUG. 5, 1910.

1,038,763.

Patented Sept. 17, 1912.

5 SHEETS—SHEET 4.

WITNESSES

INVENTOR
GEORG KLEEMANN

BY

ATTORNEY

G. KLEEMANN.
MACHINE FOR MAKING BRUSHES.
APPLICATION FILED AUG. 5, 1910.
1,038,763.
Patented Sept. 17, 1912.
5 SHEETS—SHEET 5.
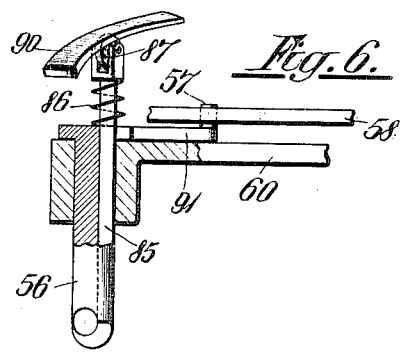
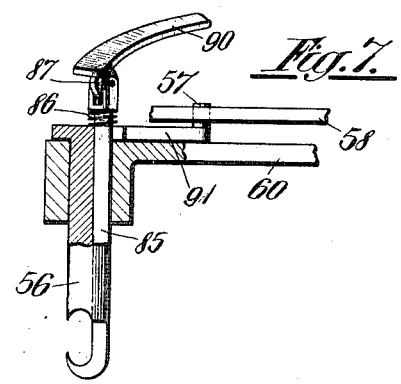
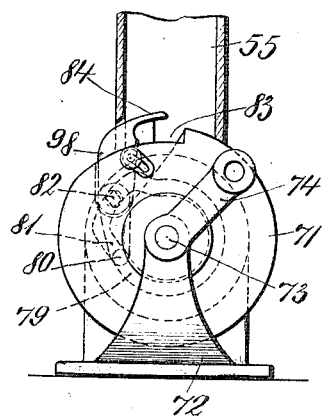
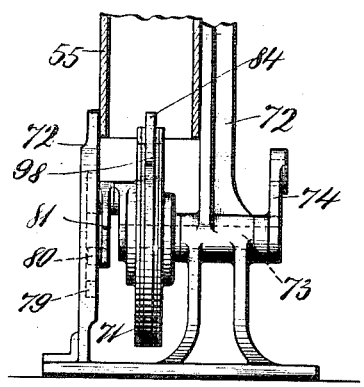
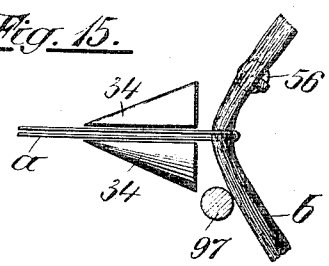
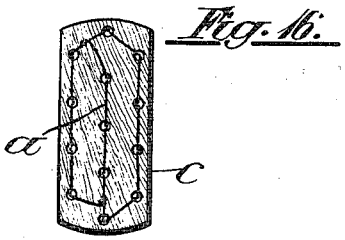
WITNESSES
INVENTOR
GEORG KLEEMANN
BY
ATTORNEY

UNITED STATES PATENT OFFICE.

GEORG KLEEMANN, OF STUTTGART, GERMANY.

MACHINE FOR MAKING BRUSHES.

1,038,763.  Specification of Letters Patent.  Patented Sept. 17, 1912.

Application filed August 5, 1910. Serial No. 575,789.

*To all whom it may concern:*

Be it known that I, GEORG KLEEMANN, a citizen of the German Empire, residing at Stuttgart, in the Kingdom of Wurttemberg, Empire of Germany, have invented certain new and useful Improvements in Machines for Making Brushes; and I do hereby declare the following to be a full, clear, and exact description of the invention, such as will enable others skilled in the art to which it appertains to make and use the same.

This invention relates to machines for automatically drawing tufts of brush material into brush blocks and has for its object to provide a machine which will automatically and finely fix the tufts in the brush in a convenient reliable and efficient manner.

Figure 1:
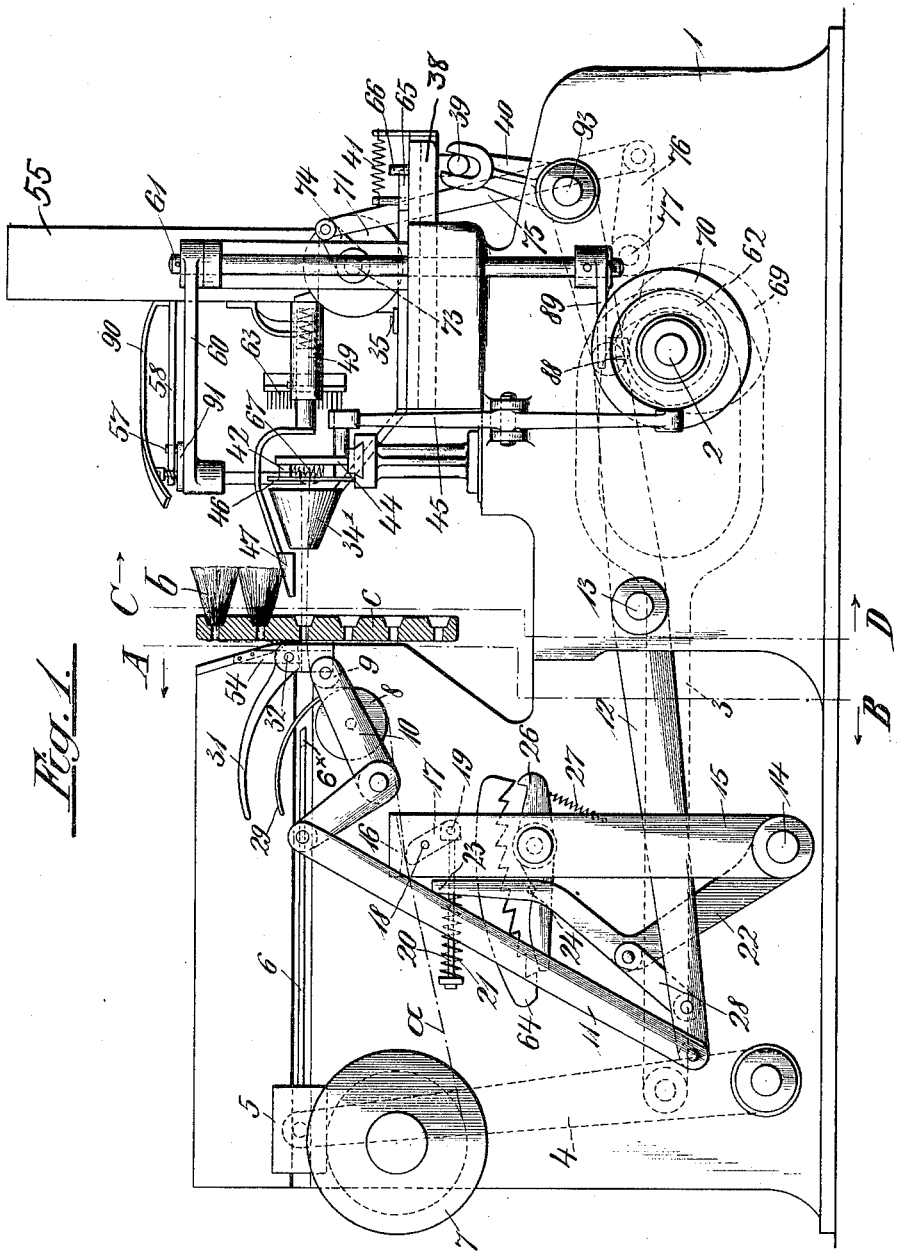
Figure 2:
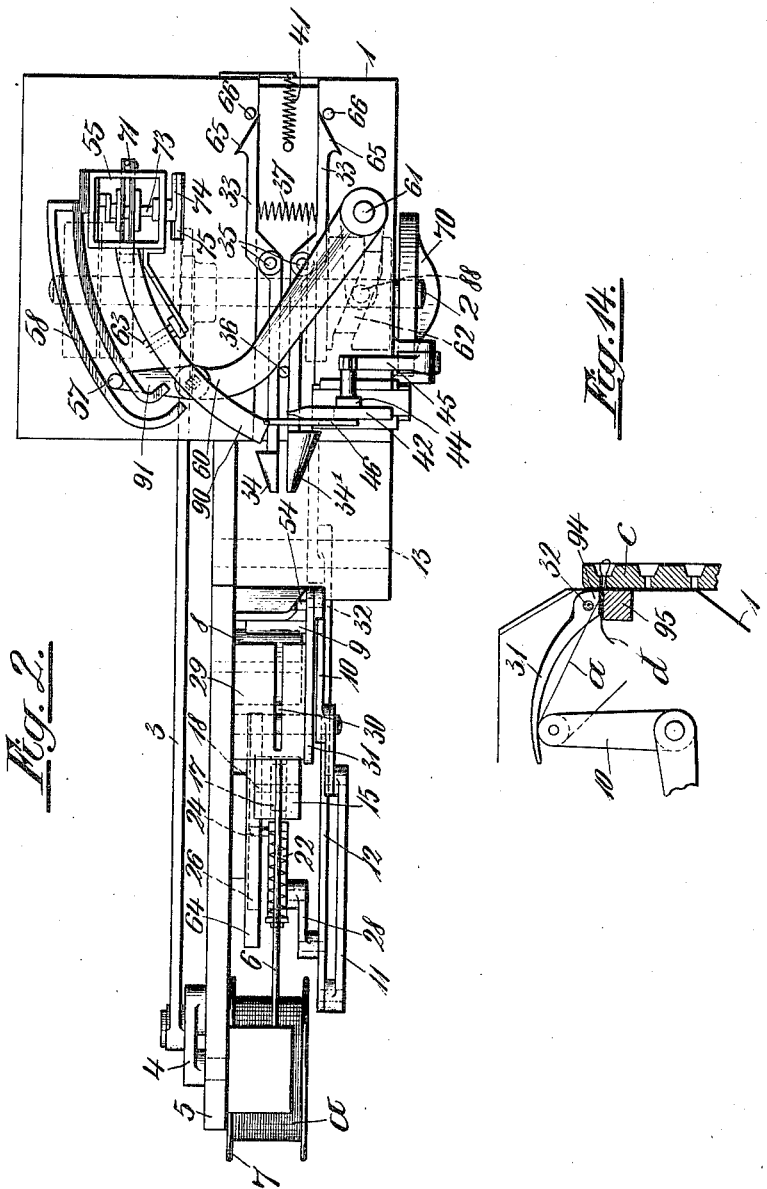
Figure 3:
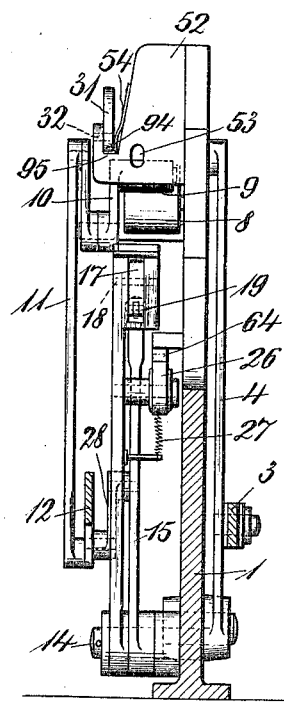
Figure 4:
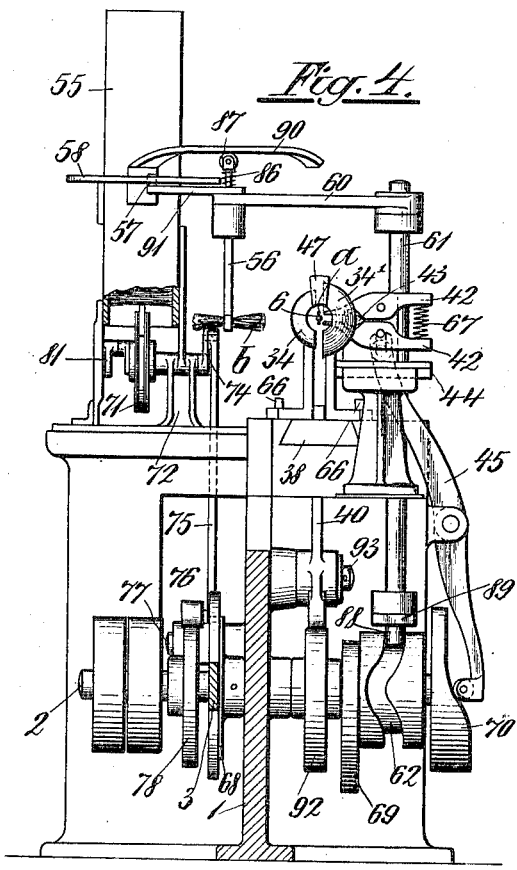
Figure 10:
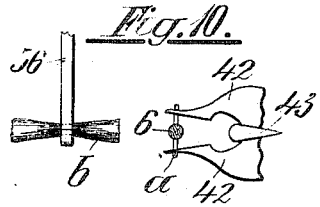
Figure 11:
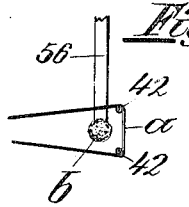
Figure 5:
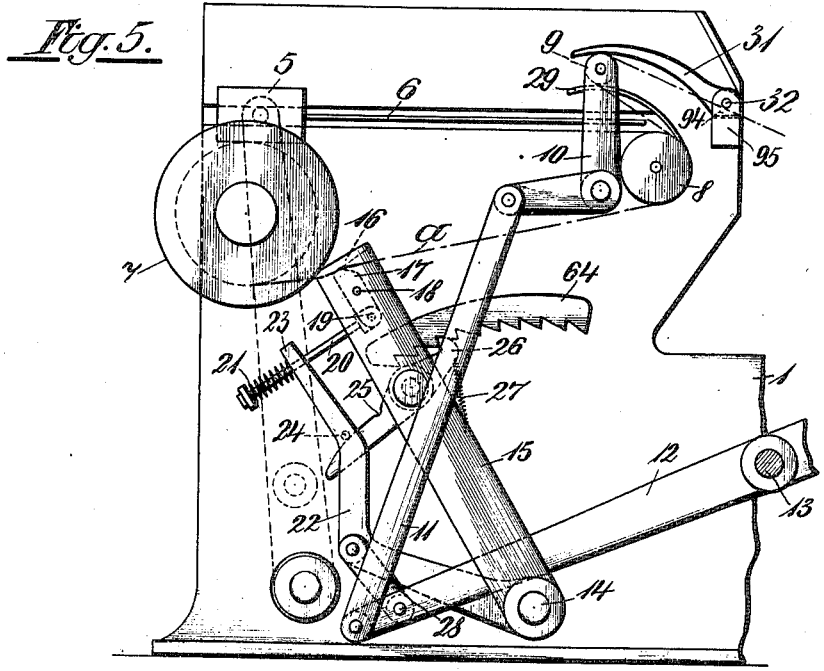
Figure 12:
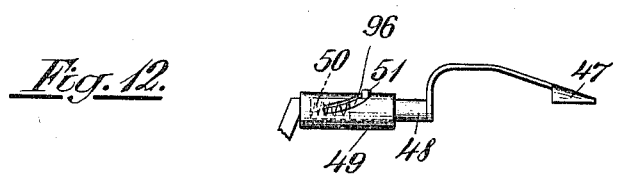
Figure 13:
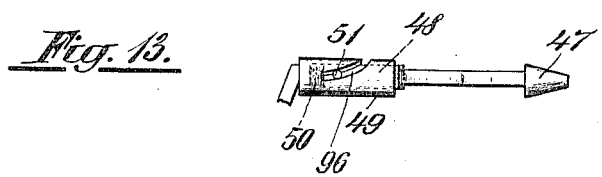

In the accompanying drawings: Figure 1 is a side view of the new machine supporting a brush block shown in section. Fig. 2 is a plan view of the machine. Fig. 3 is a lateral section along line A—B of Fig. 1. Fig. 4 is a lateral section along line C—D of Fig. 1. Fig. 5 shows in lateral section the clamping and tensioning device in its operative position. Figs. 6 and 7 show in partially sectional lateral views the gripping jaws in closed and open position respectively. Fig. 8 shows a front view of the tuft dividing device. Fig. 9 represents a side view. Figs. 10 and 11 explain in two different views the method of operation of the spreading device. Figs. 12 and 13 show in side views the initial and final position of a protecting cover. Fig. 14 shows in sectional side view a clamping device for holding fast the end of the wire. Fig. 15 is a plan view of another form of execution of the stops for the tuft. Fig. 16 represents the rear view of a brush and shows the path of the wire.

The driving shaft 2 is placed in the machine frame 1, and with the aid of a number of eccentrics and the like sets the different devices of the machine in motion. The wire $a$ to be worked, and which serves to draw the tuft $b$ into the prepared brush block $c$, is wound upon a loose rotatable reel 7, and runs through a clamping device over a guide roller 8 to the ordinary needle 6. The latter is fastened in a horizontally movable head 5, which is given a reciprocating motion by the driving shaft 2 with the aid of the eccentric disk 68 and a rod 3, as well as of a lever 4. In order to place the wire $a$ from the guide roller 8 before the needle 6 (Fig. 5), a roller 9 is provided which is carried, for example, by a bell-crank lever 10, which is operated by the driving shaft 2 by means of a link bar 11 and a lever 12, which latter turns about a pivot 13. The roller 9, according to the present invention, diverts the wire as little as possible from its original direction and simultaneously presents it before the needle 6, which is provided with an open eye $6^x$, in such manner that the path of the roller 9 crosses the needle 6 but forms the slightest possible angle with the path of the needle. If this latter moves forward it carries the wire $a$ with it and guides it into the jaws 34, 34', of the pliers 33 where the needle 6 enters the guide 46 serving also as a guard plate (Figs. 1 and 4). Here the wire is first spread open (Figs. 1, 4 and 10) and for this purpose a spreading device is provided which consists of pointed jaws 42 and is formed like pliers, being held in the closed position by a spring 67. The jaws 42 are carried by a sliding arm 44, which is pushed forward by the driving shaft 2 acting through a lever 45, or the like, and a cam 70. By this means the points of the jaws 42 enter the loop of the wire $a$ while the jaws 42 simultaneously come in contact with a suitably formed wedge shaped stop 43 which spreads them apart and hence opens out the loop, so that a tuft $b$ can be inserted therein. The latter operation proceeds in familiar fashion and for this purpose the tufts lying in a receptacle 55, or the like, are separated and inserted by pliers 56, 85 into the jaws 34, 34'. The separating of the tufts is effected as follows. (Figs. 1, 4, 8 and 9.) Into the receptacle 55 a disk 71 projects from beneath which is rigidly mounted upon a shaft 73 placed in a frame 72. Upon this shaft a lever arm 74 is provided, which, by means of a rod 75 and a two armed lever 76 rocking about a pin 77, is connected with a cam 78 and is actuated thereby. Moreover the frame 72 is provided with an eccentrically formed groove 79 in which slides a pin 80 the arm 81 of which rocks about a pin 82 of the disk 71. Upon the pin 82 there is also an arm 98, and the end of the arm 98 is formed as a finger 84, while the disk 71 is provided with a depression 83, so that upon the turning of the disk 71 the finger 84 grasps from the receptacle 55 no more of the brush material than the depression 83 can receive. Then the disk 71 is turned back so that the finger 84 and the depression 83 lie outside of the receptacle 55, while pliers 56, 85 grasp the brush tuft.

The pliers consist essentially of the pivotally arranged claw member 56, and of the depressible claw member 85 which slides in the claw member 56 and is subject to the influence of a spring 86, and carries a roller 87 at its upper end. The movement of the pliers 56, 85 is effected from the driving shaft 2 by means of a grooved disk 62 and an arm 89 provided with a pin 88, which arm is rigidly mounted on a shaft 61 positioned in the machine frame 1. The shaft 61 rocks an arm 60 in which the pliers 56, 85 are positioned, so that the latter upon the rocking of the shaft 61 are swung backward and forward (Fig. 2) from the jaws 34, 34' to the receptacle 55, or vice versa. Since the pliers, 56, 85, must open when receiving as well as when discharging the tuft, a suitably curved slide bar 90 is provided upon which runs the roller 87 which at the proper moment is depressed against the action of the spring 86, whereby the claw member 85 is lowered. (Fig. 7.) Finally the pliers 56, 85 must be so guided that the brush tuft is presented exactly in front of the jaws 34, 34'. For this purpose a guide 58 with curved end is provided in which moves a pin 57 of an arm 91 of the claw member 56, and thereby effects the necessary movement of the pliers 56, 85. The grasped tufts b, upon being inserted, pass over a comb 63 or the like, by which they are at the same time cleaned. One jaw 34' is longer than the other jaw 34 (Fig. 2), and the prolonged jaw 34' serves to guide the tuft, fed by the pliers 56, 85 into the jaws 34, 34'. In place of the prolonged jaw 34 a special cam 97 or the like, could be equally well employed (Fig. 15). The jaws 34, 34' serving to receive the tuft b are formed on pliers 33 comprising two arms which rock about pins 35 and are held closed by a spring 37, and rest upon a pin 36 which prevents complete closing of the jaws. The jaws 34, 34' are hollowed out funnel shaped, in which hollows the bent tuft rests until they reach the brush block. At the rear end the arms of the pliers 33 have wedge shaped projections 65 which, in their backward motion strike against stop pins 66 thereby opening the jaws (Fig. 2). According to the present invention the jaws 34, 34' are loosely movable and can be moved backward and forward, and for this purpose are arranged upon a carriage 38, which slides in the machine frame 1 (Fig. 4). The forward movement is effected by the drawing in of the wire and against the action of a spring 41 which exerts a retarding influence. The backward movement is effected by the driving shaft 2, and is, for example, accomplished by means of a cam 92 and a bell-crank lever 40 rocking about a pin 93, the fork like end of the lever 40 engaging a pin 39 of the carriage 38 and moving it backward together with the jaws 34, 34'. Wire clamps are also provided, only one of which comes into action at the commencement of the operation, while the other prevents the unwinding of the wire from the reel 7 when the supply of wire in front of the needle is drawn taut. (Fig. 5).

The first clamping device (Figs. 1, 3, 5 and 14) consists of a lever arm 31 which turns about a pin 32 and is positioned eccentric to the pivot pin of the lever 10, so that the roller 9 during its movement runs upon the arm 31 and turns it. Thus the arm 31, with its other portion 94, which is formed as a gripping jaw, presses the free end d of the wire which has been forced through the brush block against an abutment 95 of a plate 52 of the machine frame 1, so that the free end d of the wire a is held fast together with the tuft while the tuft is being drawn into the brush block (Fig. 14). Upon drawing in a second tuft into the second hole of the brush block c, the free end d of the wire is withdrawn from the clamp 94, 95, and the latter is not in operation for all remaining holes of the same brush. Upon swinging the roller 9 the wire a is brought into a slot 30 of a curved plate 29 through which also passes the needle 6. Now the second clamping device is provided, which works at each operation, for the purpose of preventing unwinding of the wire from the reel 7, upon drawing taut the wire lying in front of the needle 6. (Figs. 1, 3, and 5). This consists chiefly of the rigid jaw 16 mounted on the end of a lever 15 swinging about shaft 14, and further consists of a movable jaw 17 which coöperates with the jaw 16 and, pivoted on a pin 18 is positioned on the lever 15. The clamping device is set in motion by the driving shaft 2, for example, by means of the lever 12. For this purpose an arm 22 is provided which also rocks about the pin 14. This arm 22 is connected by a link-bar 28 with the lever 12, so that it is moved upon swinging the lever 12. Through the upper end 23 of the lever 22 passes a link-bar 20, which is connected by a pin 19 with the clamping jaw 17, and a spring 21 is inserted between the head of this rod 20 and the end 23 of the lever 22. Now if the lever 22 is swung back it carries with it the lever 15 at the same time clamping the wire. Due to the action of spring 21, the lever 15 is arrested in a determined position, while the lever 22 continues to move and the tension of the wire, relieved by spring 21, does not increase considerably. To arrest the lever 15 it is provided with a pawl 26 which is subject to the influence of a spring 25 and co-operates with a curved rack 64. Before swinging back the lever 15 (Fig. 1) the pawl 26 is held by its spring 27 out of engagement with the teeth of the curved rack 64 and a pin 24 of the lever 22 lies in a notch 25 of the pawl 26. Now if the parts have arrived at the position shown in Fig. 5 and the lever 15 has met with some resistance from the clamping action, the pin 24 of the lever 22 leaves the notch 25 of the pawl and runs upon its free arm. But the pawl 26 is thereby rocked and brought into engagement with the rack 64 whereby the lever 15 is arrested. Upon the return the movements are completed and reversed, so that the pawl again becomes free and the parts can all be swung back.

Now in order to prevent the bristles of a tuft b already inserted from being pressed in the jaws 34, 34' and jammed when the next tuft is inserted, a guard cap 47 is provided which covers the jaws 34, 34' and by means of its pin 48 is mounted axially movable in a bushing 49 of the machine frame 1. (Figs. 1, 4, 12 and 13). The cap 47 is subject to the influence of a spring 50 and is provided with a pin 51, which engages in a slanting groove 96 of the bushing 49, so that the cap 47 upon pressing against the brush block is simultaneously rotated and releases the tuft just inserted. Finally a spring 54 is provided (Figs. 1 and 3) which insures the guiding of the wire a under the clamping lever 31.

The manner of operation is as follows: After the operator has pressed the wire running from the reel 7 between the jaws 16 and 17 of the lever 15, wound it around guide rollers 8 and 9 and from below has placed it in the eye of the needle projecting in its extreme position over the plate 52, he passes the free end of the wire between the spring 54 and the lever 31 into the clamping jaws which are formed by the lever 31 and the abutment 95 of the plate 52, and, after he has placed the brush block as indicated in Fig. 1, he starts the machine. The needle moves forward and, since the end d of the wire is clamped fast, wire is drawn from the reel 7, and the needle carries the wire to the jaws 42 which pass into the loop of wire, whereupon the needle returns into the plate 29. Then the pliers 56, 85 bring into the loop (Figs. 4, 10 and 11) the tuft b separated out of the receptacle 55 and bend it by means of the prolonged head of the gripper member 34' into U-form. Simultaneously the jaws 42 return to their position of rest. The wire, while the clamping jaws 16, 17 and 94, 95 are held fast is drawn by the roller 9 by means of the lever 10 and by the movement of the lever 15. In this way the tuft b is drawn into the jaws 34, 34' in which it remains until the gripper members reach the brush block. In this way the tuft b is drawn into the jaws 34, 34', in which it remains until the gripper member reaches the brush block, while during insertion of the tuft b the spring 41 exerts a checking effect. Then the gripper members, which hold the tuft fast, open, and the tuft is drawn by the wire into the brush block. The drawing in lever, the pliers 56, 85 and gripper member 34, 34' then return to their positions of rest. The operator then draws the free end of the wire from the clamp 94, 95, and manually brings the next hole of the brush block c over the projecting needle point, starts the machine again, and the operation is repeated, the needle carrying to the jaws 42 the wire brought over it from the roller 9. The operator has only to move the brush block upward from hole to hole, and to start the machine. As shown in Fig. 16 the ends of the wire of a finished brush are wound several times about the drawn in wire, making it sufficiently secure.

I claim:

1. In a machine for making brushes, means for supporting a brush block, a loosely movable pliers feeding tufts of brush material to the block, a retractile spring retarding the forward movement of the pliers, in combination with means for passing loops of wire through the brush block and means for causing the wire to draw the tuft into the brush block.

2. In a machine for making brushes, means for supporting a brush block, movable jaws adapted loosely to hold tufts of brush material, a spring maintaining the jaws in a yieldable condition, means for passing loops of wire through the brush block and to cause the wire to embrace the tuft, means for drawing said wire taut, thereby forcing the jaws against and the tuft into the brush block, in combination with a retractile spring retarding the forward movement of the jaws until the tuft is firmly fixed in the block.

3. In a machine for making brushes, means for supporting a brush block, loosely movable jaws adapted to feed tufts of brush material to the brush block, one of the jaws being prolonged and forming a stop for the brush material while the tuft is being formed and means for securing the tufts in the brush block.

4. In a machine for making brushes, means for supporting a brush block, loosely movable pliers having jaws for feeding brush material to the block, means for moving the pliers forward and back, inclined planes located in the path of the pliers, in combination with means attached to pliers adapted to engage the inclined planes and to open the pliers.

5. In a machine for making brushes, means for supporting a brush block, a movable pliers having jaws adapted to loosely hold tufts of brush material, a reciprocatory needle, means for placing a wire across the path of the needle at as flat an angle as possible to said path whereby loops of the wire are passed through the block by the needle means for placing the tufts in said loops, means for drawing said wire taut and forcing the jaws against the brush block and the tuft into the brush block.

6. In a machine for making brushes, means for supporting a brush block, a loosely movable pliers adapted to feed tufts of brush material to the brush block, means for placing loops of wire through the block, clamp jaws for gripping the wire, a pivoted lever on which the clamps are mounted, one fixedly, the other movable, in combination with a mechanically controlled arm for closing the clamp jaws.

7. In a machine for making brushes, means for supporting a brush block, a loosely movable pliers adapted to feed the tufts of brush material to the brush block, means for placing loops of wire through the brush block, jaws for clamping the wire, a lever carrying the clamp jaws, a mechanically controlled arm, a spring connecting the lever with the arm, and a brake device for holding the lever in the clamping position.

In testimony whereof I affix my signature, in presence of two witnesses.

GEORG KLEEMANN.

Witnesses:
HERMANN WIETHÜCHTER,
FRANZ GANORZ.